(12) United States Patent
Tyler

(10) Patent No.: US 12,533,610 B2
(45) Date of Patent: Jan. 27, 2026

(54) DEVICE AND METHOD FOR EMPTYING WATER TREATMENT VESSELS

(71) Applicant: Sam Tyler, Carver, MA (US)

(72) Inventor: Sam Tyler, Carver, MA (US)

( * ) Notice: Subject to any disclaimer, the term of this patent is extended or adjusted under 35 U.S.C. 154(b) by 121 days.

(21) Appl. No.: 18/529,184

(22) Filed: Dec. 5, 2023

(65) Prior Publication Data

US 2024/0307798 A1 Sep. 19, 2024

Related U.S. Application Data

(60) Provisional application No. 63/490,173, filed on Mar. 14, 2023.

(51) Int. Cl.
| | | |
|---|---|---|
| *B08B 9/00* | (2006.01) | |
| *B01D 24/48* | (2006.01) | |
| *B01D 35/16* | (2006.01) | |

(52) U.S. Cl.
CPC ......... *B01D 24/4876* (2013.01); *B01D 35/16* (2013.01); *B08B 9/00* (2013.01)

(58) Field of Classification Search
None
See application file for complete search history.

(56) References Cited

U.S. PATENT DOCUMENTS

| | | | |
|---|---|---|---|
| 1,220,640 A | 3/1917 | Kelly | |
| 1,803,797 A * | 5/1931 | Gerhardt | B67D 7/78 248/133 |
| 2,517,304 A | 8/1950 | Greening | |
| 2,708,558 A | 5/1955 | Pedersen | |
| 2,745,616 A | 5/1956 | Gomes | |
| 2,813,693 A | 11/1957 | Puddicombe | |
| 3,179,117 A * | 4/1965 | Rolla | B60P 3/00 134/107 |
| 3,298,950 A | 1/1967 | Mindler | |
| 3,561,019 A | 2/1971 | Raymond | |
| 4,970,003 A | 11/1990 | Rak | |
| 5,890,686 A | 4/1999 | Morales | |
| 6,199,910 B1 | 3/2001 | Wade | |
| 6,575,337 B1 | 6/2003 | Malavear | |
| 8,814,110 B2 | 8/2014 | Crager | |
| 9,573,102 B2 | 2/2017 | Rumph | |
| 11,260,891 B2 * | 3/2022 | Strader | B62B 3/104 |
| 2005/0263542 A1 | 12/2005 | Brezden | |

(Continued)

FOREIGN PATENT DOCUMENTS

| | | |
|---|---|---|
| DE | 40 16 609 A1 | 11/1991 |
| RU | 2 680 650 C1 | 2/2019 |

*Primary Examiner* — Cristi J Tate-Sims
(74) *Attorney, Agent, or Firm* — Lambert Shortell & Connaughton; David J. Connaughton, Jr.; Justin P. Tinger

(57) ABSTRACT

The disclosed invention pertains to a novel device and method for effectively emptying water treatment vessels. This innovation may provide a sturdy, aluminum-framed apparatus featuring a cradle and adjustable legs. The water treatment vessel may be securely fastened onto the cradle after the frame is first adjusted to a suitable height using the device's adjustable legs. A water hose may be attached to the device's fitting, directing water into the vessel for rinsing filter media or resin. The inverted vessel's contents may flow onto a washout tray for collection. This innovative device may enhance stability, ease of use, and safety, making it ideal for emptying water treatment tanks or vessels of varying shapes and sizes.

18 Claims, 4 Drawing Sheets

(56) References Cited

U.S. PATENT DOCUMENTS

2009/0317218 A1* 12/2009 Phelps .................. B65G 67/36
                                                    414/401
2010/0206331 A1*  8/2010 Shuman ................ B08B 9/0821
                                                   134/104.4
2015/0217869 A1   8/2015 Brunaux

* cited by examiner

DEVICE AND METHOD FOR EMPTYING WATER TREATMENT VESSELS

BACKGROUND OF THE INVENTION

The present disclosure relates generally to a device and method for emptying water treatment vessels. More particularly, the present disclosure relates to a device used to assist in the emptying of water filter medias and water treatment resins from different diameter water treatment vessels.

All water treatment medias and resins reach a life expectancy and eventually need to be replaced. When it's time to replace the medias and resins, the treatment vessel needs to be emptied so new medias and resins can be installed. Normally, the way the vessel is emptied, the user lays it on the floor or ground, places a water hose in it, turns the hose on, and lifts the vessel up and down as the water from the hose flushes the media or resins out. As the media or resin is being emptied, the user needs to clear the build up of material coming from the tank because it bridges up preventing more material from coming out. This process requires a constant moving up and down of the vessel and at the same time periodically clearing out the material building up until the vessel is empty. Because of the weight of the vessel, and because it needs to be manually lifted up and down multiple times during the emptying process, it can be a very time consuming and labor extensive task. It can also be very difficult for one person to perform this task.

Therefore, what is needed is a device and method for emptying water treatment vessels having all of the further described features and advantages.

SUMMARY OF THE INVENTION

The subject matter of this application may involve, in some cases, interrelated products, alternative solutions to a particular problem, and/or a plurality of different uses of a single system or article.

In one aspect, a device for emptying water treatment vessels is disclosed. In this aspect, the device has a frame connected to two or more legs, and a cradle is connected to the frame. The cradle is configured to support a water treatment vessel, and two pins pivotably connect the cradle to the frame.

In another aspect, a method of emptying a water treatment vessel with a device is disclosed. In this aspect, the device has a frame, a cradle, and two pins pivotably connecting the cradle to the frame. The method includes the following steps: (a) positioning the water treatment vessel onto the cradle; (b) securing the water treatment vessel to the cradle; (c) rotating the cradle from a rear portion of the frame to a front portion of the frame; and (d) allowing at least one of a filter media or resin to flow onto a washout tray connected to a base of the frame.

In the aforementioned aspect, the device also includes a water jetting mechanism attached to the frame, and the method of emptying the water treatment vessel also includes the following steps: (e) connecting a water hose to a fitting of the water jetting mechanism; and (f) discharging water from a plurality of nozzles connected to plumbing in fluid communication with the fitting, wherein the water is discharged into an opening of the water treatment vessel.

These aspects of the invention are not meant to be exclusive and other features, aspects, and advantages of the present invention will be readily apparent to those of ordinary skill in the art when read in conjunction with the following description, appended claims, and accompanying drawings.

DETAILED DESCRIPTION OF THE INVENTION

Figure 1:
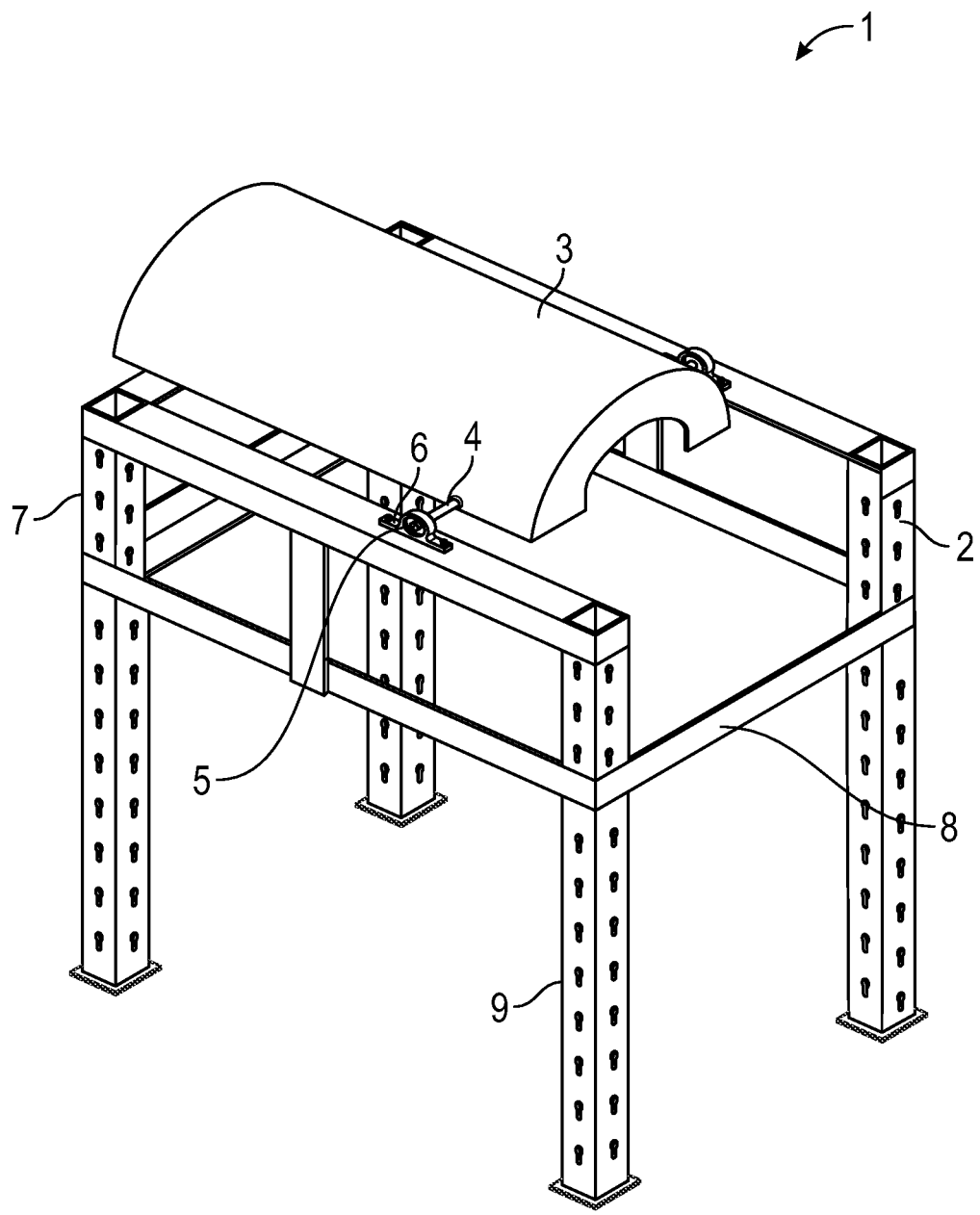
FIG. 1 provides a perspective view of an embodiment of the device according to the present disclosure.

The detailed description set forth below in connection with the appended drawings is intended as a description of presently preferred embodiments of the invention and does not represent the only forms in which the present disclosure may be constructed and/or utilized. The description sets forth the functions and/or the sequence of steps for constructing and operating the invention in connection with the illustrated embodiments.

Generally, the present disclosure concerns a device used to empty water filter medias and water treatment resins from different diameter water treatment vessels. The design consists of an elevated, framed, aluminum box with an open end cradle like part that is fastened to the top of the box which is attached to two pillow block bearings. The cradle sits in the middle of the box. The cradle has two pins that are welded to the lower portion of it. The pins sit in the two pillow blocks that are fastened to the top of the aluminum box. The pins sitting in the pillow blocks allow the cradle to be moved up and down freely. The aluminum box frame also has adjustable legs at each corner that allow the box to be elevated to different heights.

When a water treatment vessel is placed onto the cradle, it is fastened to the cradle with a strap that is attached to it. This holds the vessel in place while the cradle is moved up and down. When the vessel is manually lifted, it is raised to roughly an 85 degree angle towards the front of the box. There is an adjustable bar that is attached to the top front portion of the box that keeps the vessel from moving any farther forward than 85 degrees. The bar keeps the vessel stable allowing the user to let go of the vessel without it falling over. The bar can be adjusted for different diameter vessels in order to maintain the 85 degree angle.

A water nozzle or nozzles are attached to the frame which directs water to the inside of the tank or tray assembly. The flow of water rinses the medias or resins from the inside of the vessel. The nozzle or nozzles can be attached to any part of the frame by means of changing the direction of the plumbing that the nozzle or nozzles are attached to. Attached to the outside of the frame is a fitting that allows the user to attach a water hose. That fitting is connected to the plumbing that directs water to the nozzle or nozzles that wash the medias or resins from the vessel. The fitting that the hose attaches to can be a quick disconnect type fitting or a simple hose fitting that is manually unscrewed.

Attached to the lower part of the aluminum box is a wash out tray that guides the medias or resins from the vessel to the front end portion of the aluminum box. There are two different shaped trays that can be used depending on how the user wants the media or resins to be directed out of the box. For example; one tray on the end of it has a funnel shape that allows the user to collect the medias or resins into some type of container. The other tray is flat which allows the media or resin to discharge openly onto a floor or ground surface.

Turning now to FIG. 1, which provides a perspective view of one embodiment of the device 1. The device 1 includes an elevated frame 2 connected to a cradle 3. The cradle 3 is attached to the frame 2 by at least two pins 4 that are welded or otherwise integrally connected to a lower portion of the cradle 3. The pins 4 protrude from the sides of the cradle 3 and extend through apertures defined by at least two pillow block bearings 5. The bearings 5 are connected to a top portion of the frame 2 by fasteners 6. In other words, the cradle 3 is pivotably or rotatably connected to the frame 2.

The shape of the frame 2 resembles a box or cuboid in that the frame 2 has eight (8) corners welded or otherwise integrally connected by generally linear parts or components that define the sides of the frame 2. The frame 2 has a front portion 7 and a rear portion 8. The front portion 7 has four (4) corners connected by linear parts on both the top and the bottom of the frame 2. The rear portion 8 has only two (2) corners that are connected by one linear part on the bottom of the frame 2. In other words, one side of the frame 2 has two (2) top corners that are not connected by linear parts. This gives the cradle a greater range of motion on the rear portion 8 of the frame 2.

Each of the four (4) bottom corners of the frame 2 are connected to legs 9, which are configured to be adjustable. The adjustability of the legs 9 allows the frame 2 to be elevated to various heights. In this embodiment, the legs 9 are adjustable by a slot and pin mechanism, but it should be expressly understood that other adjustment mechanisms are within the scope of the present disclosure.

Figure 2:
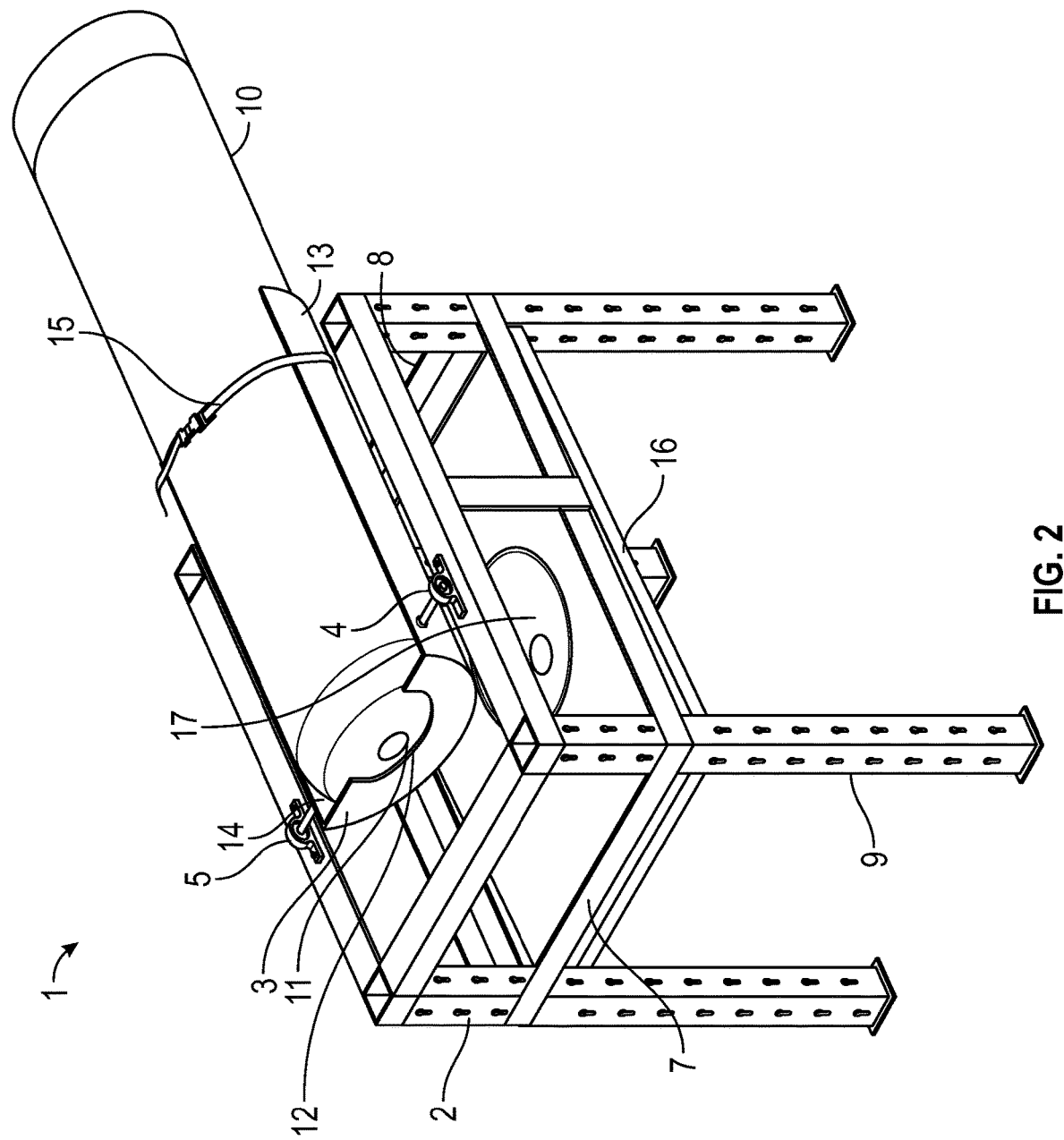
FIG. 2 provides a perspective view of an embodiment of the device supporting a water treatment vessel according to the present disclosure.

FIG. 2 provides a perspective view of the device 1 supporting a water treatment vessel 10. In this embodiment, the cradle 3 of the device 1 supports the vessel 10. Relative to the view shown in FIG. 1, the cradle 3 illustrated here is rotated towards the rear portion 8 of the frame 2 about its pins 4, which are connected to pillow block bearings 5 fastened to the frame 2. The pins 4 are constructed with sufficient load bearing capacity to support the combined weight of the cradle 3 and vessel 10.

After the cradle 3 is rotated towards to the rear portion 8 of the device 1, the vessel 10 is placed in the cradle 3 with its opening 11 positioned toward the base 12 of the cradle 3. The base 12 of the cradle 3 defines a semi-circular contour to allow media or resin to egress through the opening 11 of the vessel 10 unobstructed. As will be appreciated by those skilled in the art, when the vessel 10 is in use as part of a water treatment system, the opening 11 is located at the top of the vessel 10. In other words, it may be said that the vessel 10 is illustrated in an upside down horizontal position in the cradle 3.

The cradle 3 has two faces, an exterior, convex-shaped face 13, and an interior, concave-shaped face 14. The interior, concave face 14 of the cradle receives the vessel 10, and a strap 15 is then wrapped around both the vessel 10 and the exterior, convex face 13 of the cradle 3. The strap 15 is then tied, buckled, or tightened to secure the vessel 10 to the cradle 3. It should be expressly understood that the strap 15 may be tied to apertures that may be defined through both faces of the cradle 3.

The combination of the two cradle faces 13, 14 form a semi-cylindrical shape that mirrors the generally cylindrical shape of the vessel 10, providing for additional stability when the vessel 10 is secured to the cradle 3. In other words, the cradle 3 does not have a semi-cuboid shape, such as that of a 3-dimensional square or rectangle, because that would not provide the same level of stability as a semi-cylindrical shape.

Once the vessel 10 is properly secured to the cradle 3, any force applied to the vessel 10 will cause the cradle 3 and the vessel 10 to move in tandem. For example, in order to facilitate the emptying of media or resin from the vessel 10, the cradle 3 can be rotated from the rear end 8 of the device 1 toward the front end 7 of the device until the vessel 10 is positioned upside down and vertical within the cradle 3, allowing the contents of the vessel 10 to empty onto a wash out tray 16 attached to the base of the frame 2.

In this embodiment, the wash out tray 16 defines a funnel 17, which facilitates the collection of emptied materials from the vessel 10 at the base of the device 10. The contents from the vessel 10 may be emptied into buckets or containers of various sizes (not shown), and it should be expressly understood that, while the funnel 17 is illustrated in a central position on the tray 16 in FIG. 2, any part of the tray 16 may comprise a funnel or tapered pouring shape to facilitate the collection of emptied media and resins from any angle under or below the device 1. The legs 9 allow the height of the frame 2 to be adjusted to ensure that contents emptied from the vessel 10 properly flow into any such container or receptacle.

It should also be understood that the wash out tray 16 may be configured to detach from the frame 2. For example, in the presently disclosed embodiments, the tray 16 may be attached to or rest on one or more tabs secured to the frame 2. The tray 16 may be detached or slid out by removing it from the tab (s). Other mechanisms of attaching and removing the tray 16 from the frame 2 are within the scope of the present disclosure.

Figure 3:
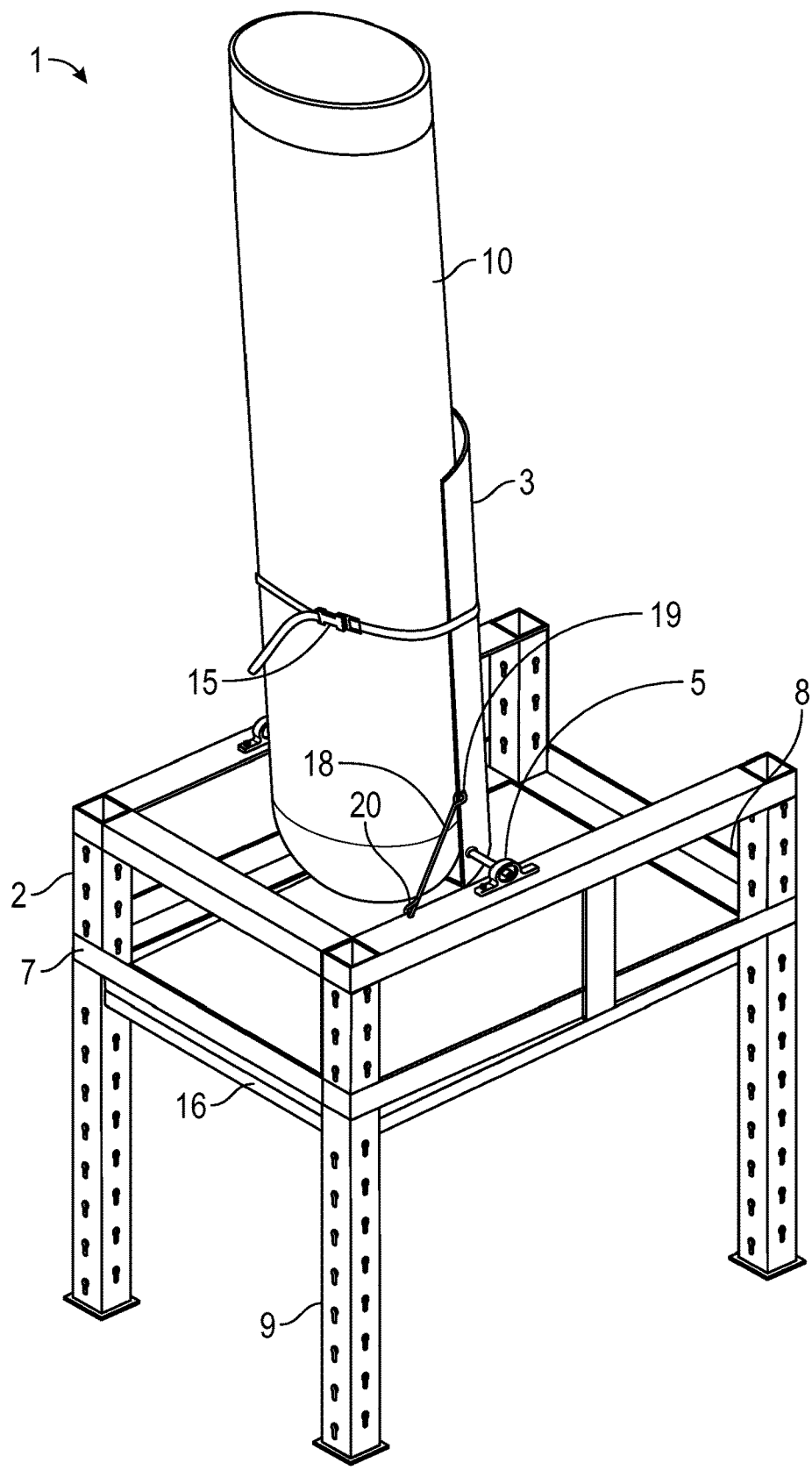
FIG. 3 provides a perspective view of another embodiment of the device supporting a water treatment vessel according to the present disclosure.

FIG. 3 provides another perspective view of a water treatment vessel 10 secured within the cradle 3 of the device 1. The vessel 10 is held in place by a strap 15, as the cradle 3 is rotated back and forth between the front portion 7 and the rear portion 8 to facilitate the emptying of media and resins from the interior of the vessel 10. The vessel 10 is illustrated in an upside down vertical position held in place by a cable 18.

The cable 18 is configured to hold the vessel 10 at an approximate 85° angle (i.e., +4°) relative to the front portion 7 of the device 1. The approximate 85° angle yields the unexpected result of facilitating the egress of media and resins from the vessel in the quickest time with the least amount of clumping or bridging, compared to other angles. Intuitively, a 90° angle should have resulted in the fastest egress times since that is when the resultant downward forces acting on the media and resins within the vessel 10 are at their maximum. However, a high degree of clumping or bridging was observed at a 90° angle in comparison to the 85° angle. Angles less than approximately 85° may have exhibited less clumping or bridging but resulted in low egress times when compared with the 85° angle.

The cable 18 is attached to an aperture 19, which is defined through both faces at the front of the cradle 3. The aperture 19 may be defined at different locations on the cradle 3 configured to adjust to different sized vessels in order to maintain the approximate 85° angle. In this embodiment, the aperture 19 is located approximately eight (8) inches up from the bottom of the cradle 3, but it should be expressly understood that other locations for the aperture 19 are also within the scope of the present disclosure. Similarly, to the aperture 19 defined in the cradle 3, an aperture 19 is also defined near the front portion of the frame 2, and two carabiner clips 20 attach both ends of the cable 18 to the apertures 19.

The frame 2 of the device 1 is designed to prevent it from tipping over when a large, heavy vessel 10, filled with media and resin, is placed in the cradle 3 and moved up and down or rotated back and forth. The placement of the pillow block bearings 5 closer to the rear portion 8 of the frame 2 provides the support necessary for movement of the combined weight of the cradle 3 and vessel 10. The placement of the bearings 5 closer to the rear portion 8 leaves more length toward the front portion 7 of the frame 2, which creates a counterbalance effect, preventing the device 1 from tipping over when the vessel is in a vertical or horizontal position.

Figure 4:
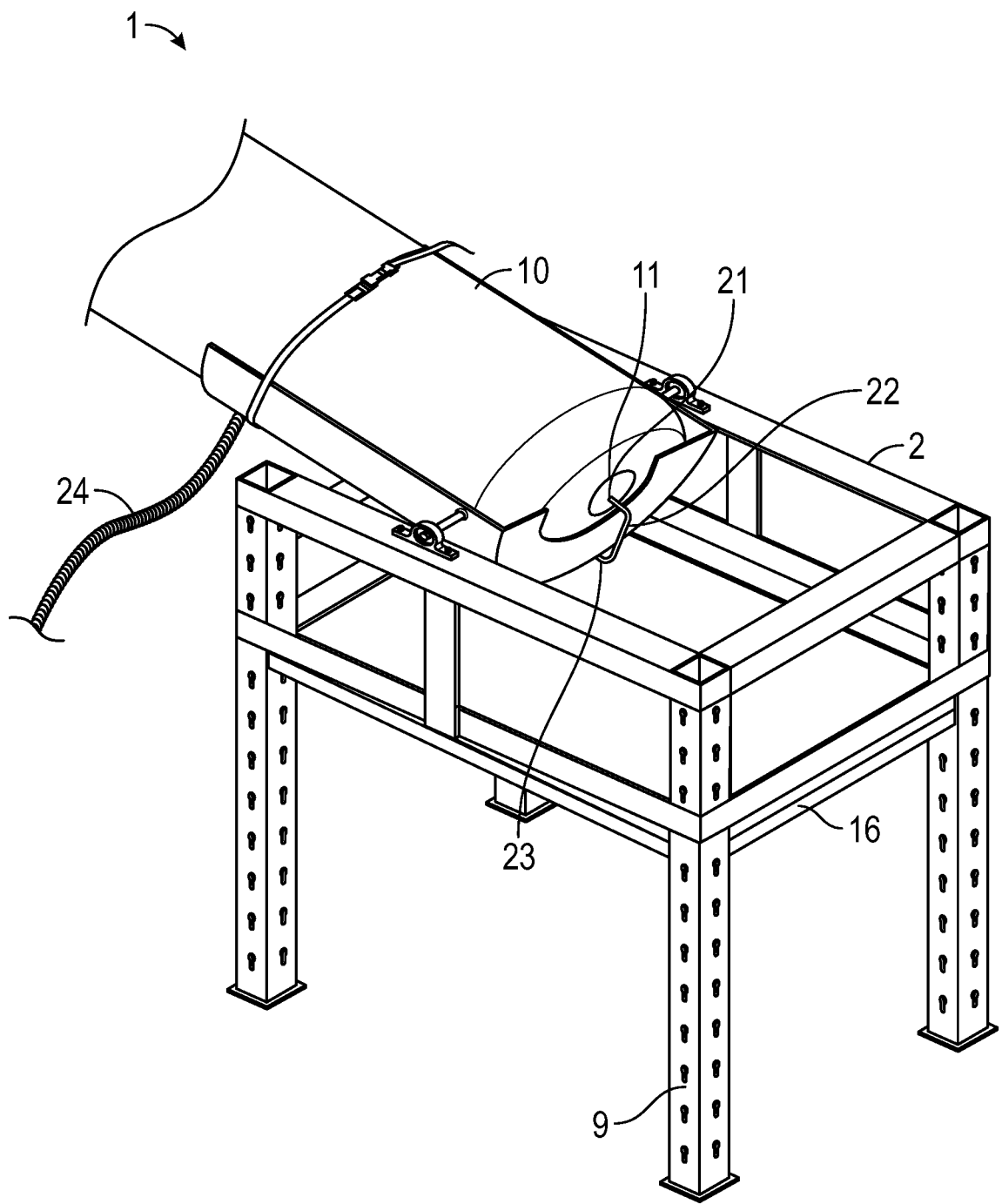
FIG. 4 provides a perspective view of an embodiment of the device with a water jetting mechanism according to the present disclosure.

FIG. 4 provides a perspective view of an embodiment of the device 1 with a water jetting mechanism for rinsing media or resins out from the inside of the vessel 10. The water jetting mechanism includes a nozzle 21 attached to the exterior face of the cradle 3 by plumbing 22. The plumbing 22 may be attached to a bracket which is welded or otherwise integrally attached to the rear of the cradle 3. Water is supplied to the nozzle 21 through the plumbing 22, which forms an elbow 23 at the base of the cradle 3. It should be expressly understood that the plumbing 22 may also be attached to the frame 2 of the device 1. A water hose 24 attaches to the plumbing 22 at the rear of the cradle 3. The connection or fitting between the water hose 24 and the plumbing 22 on the cradle 3 or the frame 2 may utilize a quick connect mechanism or a manual screw mechanism.

The elbow 23 positions the nozzle 21 towards the opening 11 of the vessel 10. In one embodiment, the position of the nozzle 21 may be adjustable at the elbow 23. The flexible placement or adjustment of the nozzle 21 ensures that water jetting from the nozzle 21 reaches the interior of the vessel 10 to facilitate the de-clumping or un-bridging of media and resins that may have formed or are in the process of forming.

In this embodiment, the media and resins are rinsed out of the vessel 10 onto a flat or planar wash out tray 16, which is attached to the frame 2 at an angle. In contrast to a tray 16 comprising a funnel shape, the flat tray 16 simply allows media or resins to be discharged from the vessel 10 and slide onto the floor or ground. This tray structure may be utilized when the media or resins do not need to be emptied into a container.

All of the embodiments described herein represent significant advancements or improvements when compared with the prior art. For example, prior art devices and methods are only concerned with emptying liquids from containers, not emptying filter media and resins from a water treatment tank. As disclosed herein, when emptying a water treatment tank or vessel, the liquid within the tank must first be pumped out before attempting to empty the filter media and resins. This pumping process may be a necessary first step in the disclosed method, as the presence of water or other liquid within the tank may render it too heavy for manual lifting. Moreover, emptying the water from the vessel first via pumping may render the tank lighter, facilitating its removal from a basement or other confined space and onto the device disclosed herein.

Prior art devices and methods also do not feature a water jetting mechanism, which, as disclosed herein, may be specifically designed for efficiently emptying the contents of a water treatment tank. This type of mechanism is important, particularly in the case of water filter media. Filter media are engineered to remove heavy particles from a water system, and these heavy particles often become adhered to the media, causing it to clump together and form bridges. Even fresh filter media, devoid of heavy particles, may have the propensity to bridge and may fail to empty freely from the tank.

The same bridging issue may apply to treatment resins, which, despite their more spherical shape and lower frictional coefficient when compared to filter media, also exhibit bridging behavior. To address this challenge, the water jetting mechanism may be configured to continuously agitate the material being emptied, preventing clumping and facilitating its smooth exit from the water treatment tank. If the only thing being emptied from the water treatment tank was a liquid having a relatively low viscosity (e.g., water), a water jetting mechanism would be an unnecessary or redundant feature.

Another notable improvement in the device designs disclosed herein is the presence of adjustable legs at the four corners of the frame. In some of the prior art, height adjustments rely primarily on notches in posts, not slots and pins or other similar adjustment mechanisms. Also, the cradle disclosed herein is permanently affixed to the frame of the device, whereas many prior art mechanisms allow a container to be removed and repositioned on different notches to achieve height adjustment. However, the adjustable height design disclosed herein is primarily intended to create ample clearance beneath the frame to ensure efficient material flow and to accommodate the placement of a washout tray and/or burlap bag or other container for material management and collection.

Furthermore, in some embodiments, the device may be crafted from a lightweight aluminum material, ensuring ease of transportation to and from service locations, especially for tanks positioned in challenging or remote areas. To enhance stability, most embodiments of the device frame are engineered to prevent tipping, and the cradle may only accommodate round or cylindrical shaped containers. Finally, in one embodiment, the device disclosed herein may utilize a cable that is attached to the cradle, with the other end of the cable featuring a hook designed to be secured to the frame or an adjustable bar attached to the frame. This feature may provide users with the convenience of releasing the tank without fear of it falling to the ground once it has been lifted to the desired position.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A device for emptying water treatment vessels, comprising:
   a frame connected to a plurality of legs, the frame having a front portion and a rear portion;
   a cradle connected to the frame, wherein the cradle is configured to support a water treatment vessel at the rear portion of the frame;
   two pins configured to pivotably connect the cradle to the frame;
   wherein the two pins are connected to two pillow block bearings on a top of the frame, such that the cradle is pivotably connected to the two pillow block bearings; and wherein the cradle is configured to rotate about the two pillow block bearings towards the front portion of the frame, such that only a base of the cradle protrudes into an interior of the frame when the cradle is in a vertical position.

2. The device of claim 1 wherein the frame is manufactured from aluminum.

3. The device of claim 1 further comprising a water jetting mechanism attached to the cradle.

4. The device of claim 3 wherein the water jetting mechanism comprises a nozzle.

5. The device of claim 4 wherein the water jetting mechanism further comprises a plumbing attached to the nozzle.

6. The device of claim 4 wherein a position of the nozzle is adjustable.

7. The device of claim 1 further comprising a tray attached to the frame for collecting material discharged from the water treatment vessel.

8. The device of claim 7 wherein the tray defines a funnel configured to facilitate the collection of material emptied from the water treatment vessel.

9. The device of claim 1 wherein the plurality of legs are configured to vary a height of the frame.

10. The device of claim 1 wherein the two pins are welded to the cradle.

11. The device of claim 1 further comprising a strap for securing the water treatment vessel to the cradle.

12. The device of claim 1 further comprising a cable attached to the frame, wherein the cable is configured to prevent the water treatment vessel from moving beyond a specific angle.

13. The device of claim 1 wherein the water treatment vessel comprises at least one of a cylindrical or round shape.

14. The device of claim 1 wherein the cradle comprises an exterior convex face and an interior concave face configured to receive the water treatment vessel.

15. The device of claim 1 further comprising a fitting connected to an exterior of the frame, the fitting configured to connect to a water hose.

16. The device of claim 1 further comprising a cable attached to the cradle at a first end of the cable.

17. The device of claim 16 wherein the cable comprises a carabiner clip attached to a second end of the cable, the carabiner clip connected to the frame.

18. The device of claim 1 wherein the frame is configured to prevent tipping when the water treatment vessel and the cradle are moved or rotated.

* * * * *